Dec. 20, 1927.
A. W. WARD
ROLLER BEARING
Filed Nov. 7, 1925
1,653,073
2 Sheets-Sheet 2
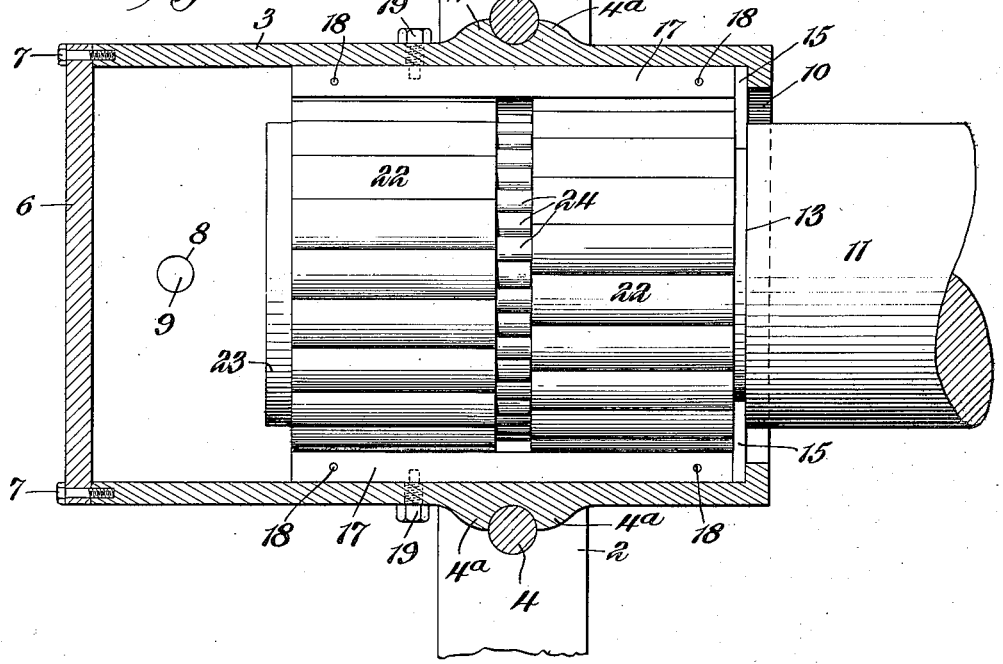
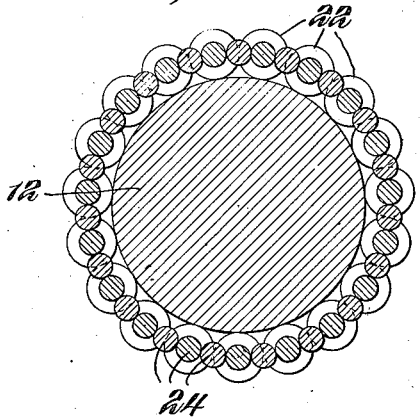
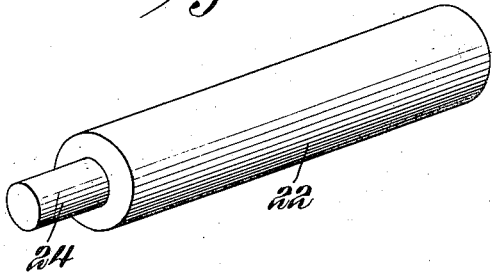
Witnesses
Chas. L. McDonald.
Howard D. Orr.
Inventor
Andrew W. Ward
By
C. G. Siggers
Attorney Patented Dec. 20, 1927.

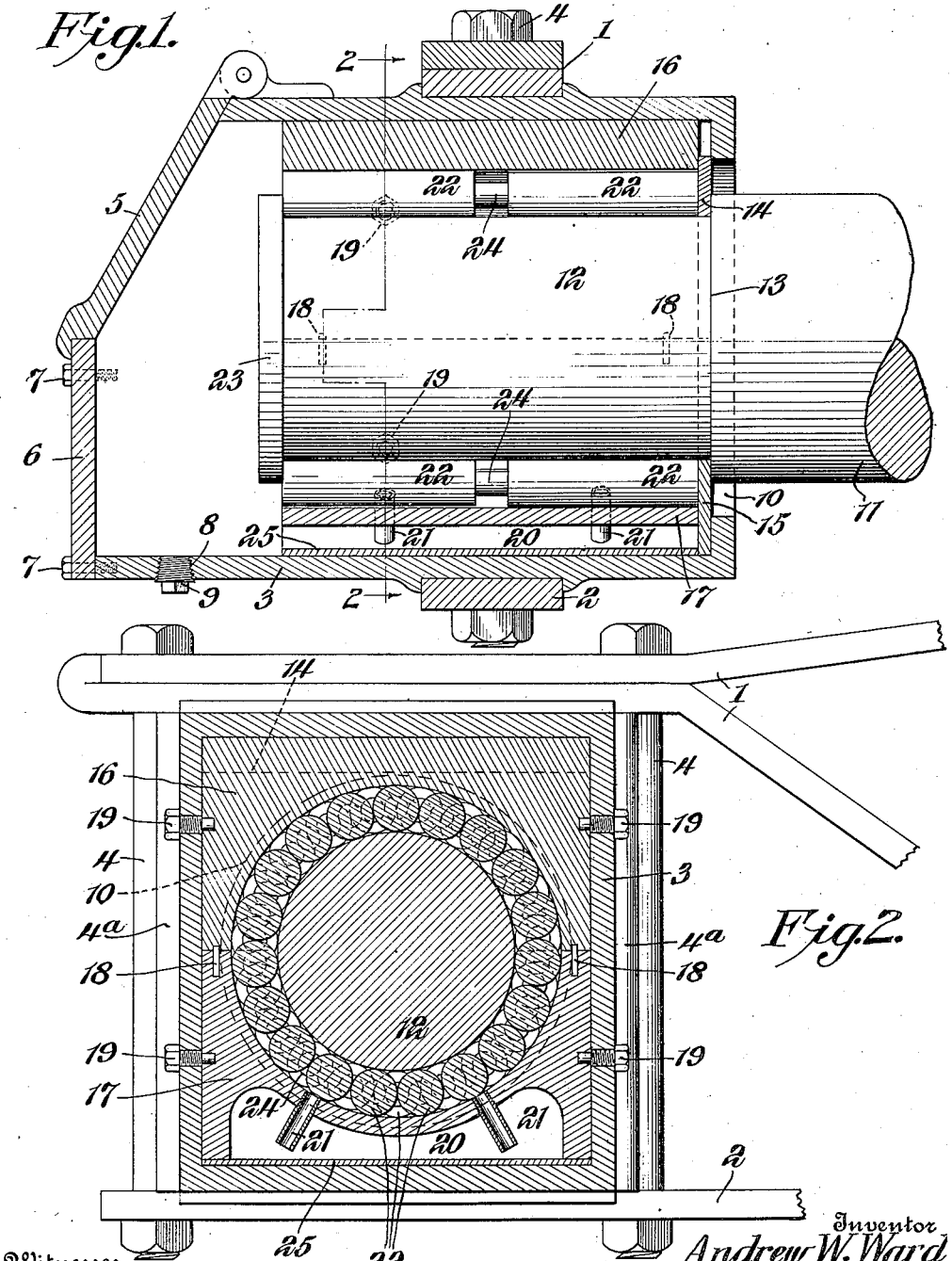

UNITED STATES PATENT OFFICE.

ANDREW W. WARD, OF CHARLESTON, WEST VIRGINIA, ASSIGNOR OF FIVE-EIGHTHS TO THOMAS C. McKINLEY, ONE-EIGHTH TO ALLISON GARNETT THOMPSON, ONE-EIGHTH TO JOHN M. JAVINS, ALL OF CHARLESTON, WEST VIRGINIA, AND ONE-EIGHTH TO CHARLES T. BROOKSHIRE.

ROLLER BEARING.

Application filed November 7, 1925. Serial No. 67,632.

This invention relates to roller bearings.

The object is to provide a roller bearing which may be used for general purposes, but which is especially designed and adapted for use in journal boxes of railway trucks or in similar places where a heavy duty bearing is essential.

Another object is to provide a roller bearing of this character which may be used in conjunction with an ordinary journal box without the necessity for any material change in the latter, and which may be readily installed in position and access easily obtained thereto for the purpose of installing new parts or otherwise repairing the same.

A further object is to provide a roller bearing for journal boxes which employs a double series of hardened rollers constantly in direct contact with the spindle end of the journal and in staggered relation to each other and bearing around the entire double series against the surrounding shoe or shoes, thus serving to distribute the weight to a greater number of rollers than usual and causing each roller to support its share of the weight in turn, the entire series being caused to roll around the orbit without the use of a cage or cages.

A final object is to provide a bearing for a journal in a journal box wherein the rollers between the spindle and the shoes or "brasses" are so associated as to prevent any longitudinal movement of the box relative to the spindle or journal, and wherein the said rollers are so formed as to provide means for feeding the oil constantly to the top of the double series, thus providing for the automatic lubrication of the bearing, the oil being free to gravitate quickly to the bottom of the journal box again, so that a constant supply of fresh oil is carried to the top of the bearing.

A full and complete understanding of the invention may be obtained from a consideration of the following detailed description, taken in connection with the accompanying drawings forming a part of this specification, it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 1 is a vertical, longitudinal section through a journal box having the improved bearing installed therein.

Figure 2 is a transverse sectional view taken on the line 2—2 of Figure 1.

Figure 3 is a central, horizontal section of the same.

Figure 4 is a detail transverse section of the spindle and the series of rollers around the same.

Figure 5 is a detail perspective view of one of the rollers.

Referring to the drawing and particularly to Figure 2 thereof, there is shown the upper and lower frame members 1 and 2 respectively of an ordinary railway truck, in which a box or casing 3 is mounted in the usual manner and held by the usual bolts 4 arranged at either side thereof between the vertical ribs or flanges 4ª for the purpose of rigidly mounting the said box in the truck. The box and truck may be of any of the well known forms and held in connected relation in any other desired manner, except that said box, in addition to the usual swinging front door 5, has the lower portion thereof in the form of a removable plate 6 held in position by the bolts 7 entering the lower vertical front edges of the sides of the box. The bottom wall of the box, adjacent to the front edge thereof and at a central point, is further provided with a drain opening 8 into which is adapted to be screwed a closure plug 9 for retaining oil or grease and for removing the same when unfit for use.

The rear wall of the box or casing 3 is provided with a central opening 10 of somewhat greater diameter than the car axle 11 and through which the latter extends, with the reduced spindle end 12 of the axle extending into the box in the usual manner. The shoulder 13 formed by the reduction of the axle lies in line with the inner face of the rear wall of the box, and the enlarged opening 10 in the same is adapted to be closed by an upper and a lower plate 14 and 15 respectively, which fit against the said inner face of the rear wall of the box, abutting against said shoulder and having complementary semi-circular openings of a diameter to snugly fit the spindle. The upper plate 14 is not as high as the lower plate 15, and a space is provided between the top of same and the top wall of the box or casing, as clearly shown in Figure 1 of the drawing, and the front end of the spindle 12 is spaced from the front wall and the filling door of the box so as to provide a space for packing with grease.

Mounted within the box and in surrounding relation to the spindle, is an upper and a lower shoe 16 and 17 respectively, said shoes, which are commonly known as "brasses" from the fact that they have heretofore been usually made of brass, are, in the present invention formed of hard steel, and are each provided with a semi-circular inner wall to form a complete circular wall around the spindle and spaced from the same. The abutting edges of the shoes are on a level with the center of the spindle and, in addition to snugly fitting the box, are further held in alinement by means of pins 18 along their abutting edges and by screws 19 passing through the side walls of the box and entering the outer sides of each shoe. The upper shoe constitutes the actual bearing shoe and takes the load of the car and contents, while the lower shoe forms a continuous circular track for rollers, as will be described, and said lower shoe is further provided with a space or cavity 20 in the bottom thereof, and extending from front to rear thereof, to provide a chamber for the flow of grease or oil from the front of the box. The lower wall of the lower shoe, which is thus somewhat thinner than the upper shoe, is provided with threaded apertures into which tubular ducts 21 are screwed, a pair of said ducts being located adjacent to both the front and rear ends of the spindle and arranged at an angle directed toward the axis of the said spindle, as clearly shown in Figure 2 of the drawings. These ducts are adapted to supply oil or grease to the space between the spindle and the lower shoe and to alternately carry off the oil, depending on which direction the spindle is turning, or on which direction the truck is moving.

Mounted in the space between the spindle and the shoes are an inner and an outer series of rollers 22, preferably formed of nickel steel and of a diameter to snugly fit the space, said rollers being substantially equal in length to one-half the length of the spindle, the inner ends of the inner rollers abutting against the aforesaid closure plate formed of the members 14 and 15, while the outer ends of the outer series of rollers are exactly flush with the end of the spindle and are held from outward movement by an integral flange 23 formed on the end of the spindle and having a peripheral diameter equal to the diameter of the axle.

Each roller is provided at its inner end with an integral trunnion 24 and when the rollers are placed in position around the spindle, the trunnions of one series of rollers are placed between the trunnions of the other series, so that the trunnions all abut against each other, as well as the rollers, and the two series of rollers are arranged in staggered relation to each other. With this arrangement, according to the size and proportions of the several parts, provides for a wider bearing area upon the top of the spindle, the weight being taken substantially upon five rollers of one series and four of the other, as shown in Figure 2 of the drawing, with the result that there is less wear upon the spindle and shoes and upon the rollers, resulting in a longer life of the entire journal bearing. The contact of the several rollers of each series with each other and with the shoes and spindle serves to cause all the surfaces to be constantly lubricated, the oil being carried up in the spaces between the rollers and upon the spindle and in the outer spaces around the inner face of the upper shoe, to the top of the bearing, where the excess finds an outlet through and down the circumferential channel formed by the reduced inner ends of the rollers, the said trunnions forming, in effect, an inner and an outer channel for the purpose. The interfitting inner ends of the rollers serve to maintain the same in exact longitudinal alinement with the axis of rotation of the spindle, and also serve to cause uniform rotation of the two series in staggered relation about said spindle. Owing to the inclination of the aforesaid ducts 21, the oil will be drawn up one and forced partially out of the other, depending upon the direction of rotation of the spindle and rollers, and the excess will be carried up and over the bearing, as aforesaid, to supply a thin film of lubrication on all the parts.

In assembling the parts of the bearing, the front plate 6 is removed and the spindle 12 is projected into the box through the rear opening 10 and the plates 15 and 14 placed in position in the order named. The said spindle, axle and wheel (not shown) are then jacked up and held in elevated position, with the axle at the top of the rear opening 10 and the upper edge of the plate 14 contacting with the top of the box. The front, integral flange 23 is held high enough to permit the lower shoe 17 to be placed in position upon the bottom of the box and contacting with the lower plate 15 at the rear thereof. This provides ample space between the lowest point of the flange 23 and the lower shoe for the introduction of several of the rollers 22 which may freely be placed in position with their trunnions 24 interfitting at their inner ends. The jacks are now removed and the axle is lowered to the center of the opening 10 and rests upon the plate 15. The remainder of the rollers of each series may now be placed in position around the spindle and between the plate 14 and end flange 23, there being ample space for the purpose over said flange, when the front, swinging door 5 is thrown open. The spindle, together with the two surrounding series of rollers, and also the lower shoe, which is slightly below center, will now permit of the introduction of the upper shoe 16, to surround and house the upper rollers, as the pins 18 carried at each side of the said lower shoe will permit of the passage of the lower, depending side portions of the upper shoe. A shim 25, the full width of the interior of the box is now driven in beneath the side legs of the lower shoe, said shim abutting against the rear, lower plate 15 and elevating the lower shoe, together with the rollers into central position, and causing the exposed portions of the side pins 18 to enter their seats in the depending portions of the upper shoe. The screws 19 are now secured in position to hold the shoes, after which the front plate 6 is fastened in position.

From the foregoing it will be seen that a simple, strong and durable roller bearing has been provided which is especially adapted for heavy duty, such as in car trucks and for general railway use, the rollers which may be easily installed and replaced, being so associated as to cause the weight of the load thereon to be more generally distributed and so shaped, together with the related parts, as to provide for a constant automatic lubrication of all the parts.

What is claimed is:

1. A roller bearing for railway or other trucks comprising opposite series of separate rollers arranged around and contacting at their inner radial points with the wheel spindle, upper and lower concave shoes constituting a complete circle and surrounding the rollers and contacting with the outer radial points of the rollers, each roller having a reduced trunnion at its inner end, the trunnions of one series fitting between the opposed trunnions of the other series to maintain the series in staggered relation and to provide an intermediate, annular oil channel.

2. A roller bearing for railway trucks having a journal box and a spindle entering the same, an upper and a lower shoe fitting in the box and each having a semicircular inner face to constitute a circular passageway for the spindle and spaced from the latter, spaced substantially radial oil ducts carried by the lower shoe and communicating with the passageway in spaced relation to the ends of the shoe, an inner and an outer continuous series of rollers interposed between the spindle and the shoes, the rollers of one series being staggered with relation to those of the other, each series rolling over the inner ends of the oil ducts, each roller having a reduced trunnion formed at its inner end, the trunnions of one series fitting between those of the other to hold the rollers in staggered relation and to form a circular oil space or channel at the central portion of the bearing.

3. The combination with a journal box and a spindle entering the same, of an upper and a lower bearing shoe fitting the rear portion of said box and providing a complete circular space surrounding the spindle, the lower shoe having an oil space in its lower portion and oil conducting tubes mounted in the lower shoe and communicating with said surrounding space and with the oil space, an upper and a lower plate fitting against the shoulder of the spindle and closing the rear end of the box, an inner and an outer series of rollers located in and filling the said circular space, the rollers of each series having interfitting trunnions at their inner ends to hold them in equal staggered relation to each other and to provide an inner and an outer circular oil channel, and a flange formed in the end of the spindle and overlapping the outer ends of the rollers to prevent longitudinal movement of all of the rollers.

In testimony that I claim the foregoing as my own, I have hereto affixed my signature.

ANDREW W. WARD.